United States Patent [19]
Yumoto et al.

[11] Patent Number: 5,856,825
[45] Date of Patent: Jan. 5, 1999

[54] IMAGE VOICE SYNCHRONIZED MULTIMEDIA MAIL SYSTEM AND METHOD THEREOF

[75] Inventors: Kazuma Yumoto, Yokohama; Naoko Iwami, Machida; Keiko Takahara, Kawasaki; Susumu Matsui, Machida, all of Japan

[73] Assignee: Hitachi, Ltd., Tokyo, Japan

[21] Appl. No.: 526,661

[22] Filed: Sep. 11, 1995

[30] Foreign Application Priority Data

Sep. 14, 1994 [JP] Japan ................................ 6-219788

[51] Int. Cl.$^6$ ................................................ G06T 3/00
[52] U.S. Cl. ...................... 345/302; 345/329; 395/200.34
[58] Field of Search ........................ 395/806, 807, 395/200.34; 364/514 R, 514 A; 358/402; 707/501, 512; 345/302, 329, 330; 348/14; 379/93.24, 100.08; 370/260, 265

[56] References Cited

U.S. PATENT DOCUMENTS 5,430,835   7/1995   Williams et al. ...................... 395/806
5,471,576  11/1995   Yee ........................................ 395/807

OTHER PUBLICATIONS

CreativePartner, emotion, pp. 1–3, 45–53 Oct. 1994.
Diamond: A Multimedia Message System Built on a Distributed Architecture, Computer, pp. 65–78, 1985.
Person to Person/2, Copyright International Business Machines Corporation, pp. 1–1 to 1–3, 7–1, Jan. 1994.
imagexpo, Group Logic, Inc. pp. 85–100, 1994.
ShareVision, ShareView Reference Manual, pp. 1–2, 38–57, 1993.
Whiteboard, Group Logic, Inc., pp. vii–xii, Feb. 10, 1993.

*Primary Examiner*—Joseph H. Feild
*Attorney, Agent, or Firm*—Fay, Sharpe, Beall, Fagan, Minnich & McKee

[57] ABSTRACT

A multimedia mail system and a method thereof generates a message including comments or notes on a background picture using voice and drawing data. The message is sent to a destination terminal using a mail system, and then is regenerated. The voice and drawing data of the received message is synchronized in the same time relation as that used for generation of the message.

2 Claims, 11 Drawing Sheets

IMAGE VOICE SYNCHRONIZED MULTIMEDIA MAIL SYSTEM AND METHOD THEREOF

BACKGROUND OF THE INVENTION

1. Field of the Invention

The present invention relates to a multimedia mail system and a mail terminal device and a method thereof, and particularly to a multimedia mail system and a mail terminal device and a method thereof for generating a message using voice and drawing data to a destination terminal to which the message is transmitted, transmitting and receiving the generated message using a mail system, and regenerating the voice and drawing data of the received message in the same time relation between them as that used for the generation of the message.

2. Description of the Prior Art

In a conventional electronic mail system, mostly text information is handled. Even in a system which can handle media other than text such as a picture and/or voice, they are handled independently and asynchronously. For example, a picture and voice can be added to mail as different icons, respectively and a user can refer to them as required. Each medium is handled independently like this.

In these conventional mail systems, mostly text information is handled and even when media other than text such as a picture and/or voice media are handled, each medium is handled independently and asynchronously.

SUMMARY OF THE INVENTION

An object of the present invention is to provide a multimedia mail system and a mail terminal device for generating a message on an electronic material using voice and drawing data by referring to the material, transmitting and receiving the generated message using a mail system, and regenerating the received message without the voice being broken even in a pseudo-multitask environment by synchronizing the voice with the drawing data at the same timing as that for generation of the message.

Another object of the present invention is to provide a multimedia mail system and a mail terminal device for newly generating and transmitting a mail using voice and drawing data by quoting background information and drawing information in a mail generated by using voice and drawing data.

To accomplish the above objects, the present invention comprises a plurality of terminal devices and a network for connecting the terminal devices to each other, and at least one first terminal device among the plurality of terminal devices generates a message on the basis of the mutual time relation between the drawing data and the voice data, sends the generated message to the network, and at least one second terminal device among the plurality of terminal devices regenerates the drawing data and voice data included in the message in the same time relation as that for generation of the message on the basis of the received message.

More concretely, in a mail system of the present invention wherein a plurality of terminals and a mail server for storing mails are connected to a network and each terminal has a communication interface for connecting to the network, a voice processing means to which a voice input/output device is connected, a data input means for inputting text and drawing data, a display for displaying text and drawing data, a file device for storing a program, a memory for reading a program when it is executed, and a processor, each terminal records time information and coordinates information in the drawing data recording file whenever a drawing of every point in a point by point drawing occurs for generating a mail, records voice data stored in the voice processing means in the voice data recording file in every interval between drawing events, regenerates the drawing data when the time elapsing after the mail regeneration start time reaches the time recorded as drawing data at the time of mail regeneration, monitors the remained voice data of the voice processing means in the intervals of drawing data regeneration of one point, and regenerates at the same timing as that for mail generation by supplying voice data when there are little remained data.

For regenerating a mail, without monitoring the remained voice data of the voice processing means in the intervals of drawing data regeneration of every point and supplying voice data, each terminal can calculate the time interval for supplying voice data to the voice processing means from the buffer capacity of the voice processing means and the time required for regenerating voice data and supply voice data to the voice processing means in the time interval.

Furthermore, each terminal can generate information in the state in which drawing information is described in background information from the background information and drawing information included in a received mail as new background information, generate a message using voice and drawing data for this new background information, and transmit it to a destination terminal which is designated for transmission.

The present invention having the aforementioned constitution has the function and operation indicated below.

According to the present invention, the time required for drawing is recorded together with coordinates data for recording drawing data, so that drawing data can be regenerated at the same timing as that for message generation. For recording drawing data when a drawing event occurs and recording data stored in the voice processing means into the voice file in every interval of a drawing event, the time for drawing data is recorded for every point so as to prevent voice data from missing. By monitoring the remained voice data of the voice processing means in every interval of drawing data generation of every point, the drawing data is regenerated at the same timing as that for message generation without generation of any break in the voice information.

Also by a means for calculating the time for supplying voice data to the voice processing means from the buffer capacity of the voice processing means and the time required for regenerating voice data and supplying voice data to the voice processing means in the time interval for regenerating a mail, the drawing data is regenerated at the same timing as that for message generation without generation of any break in the voice information.

Furthermore, by a means for generating new background information in the state in which drawing information is described in background information from the background information and drawing information included in a received mail, generating a message using voice and drawing data for this new background information, and transmitting it to a destination terminal which is designated for transmission, it is made possible to generate a response using voice and drawing data or generate a new message by quoting the received information.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

Figure 8:
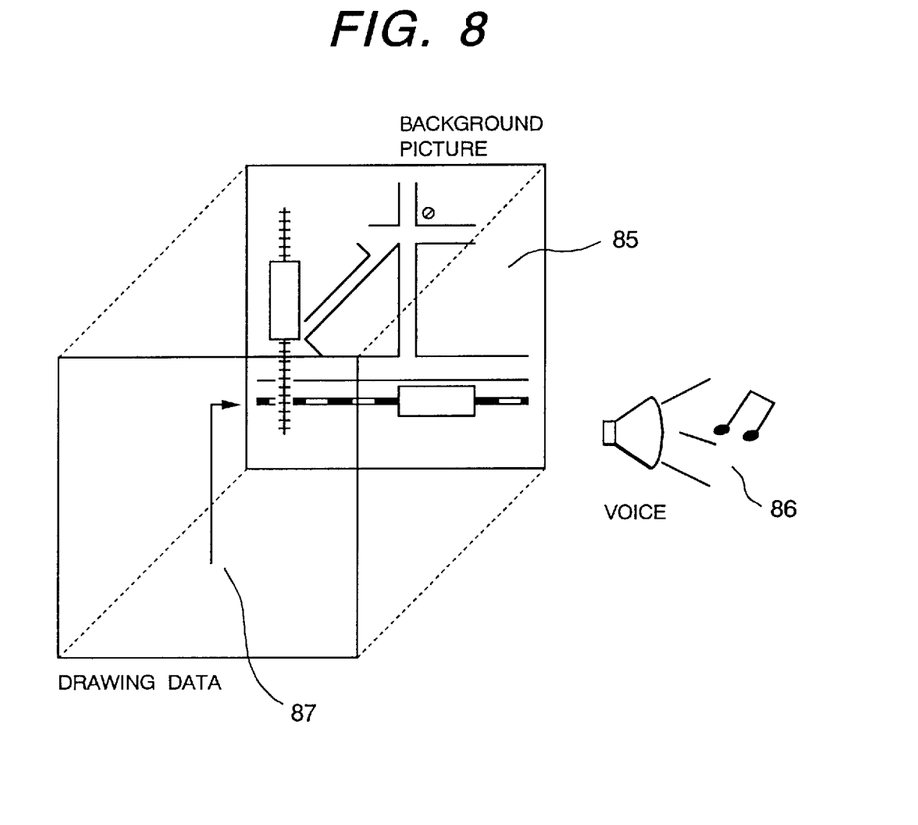
FIG. 8 is an image drawing of message regeneration.

In the multimedia mail system of the present invention, as shown in FIG. 8, a message comprising voice 86 and drawing data 87 which uses a background picture 85, which will be a material, can be transmitted. When this message is regenerated, the voice 86 and the drawing data 87 are regenerated at the same timing as that for message generation.

Figure 1:
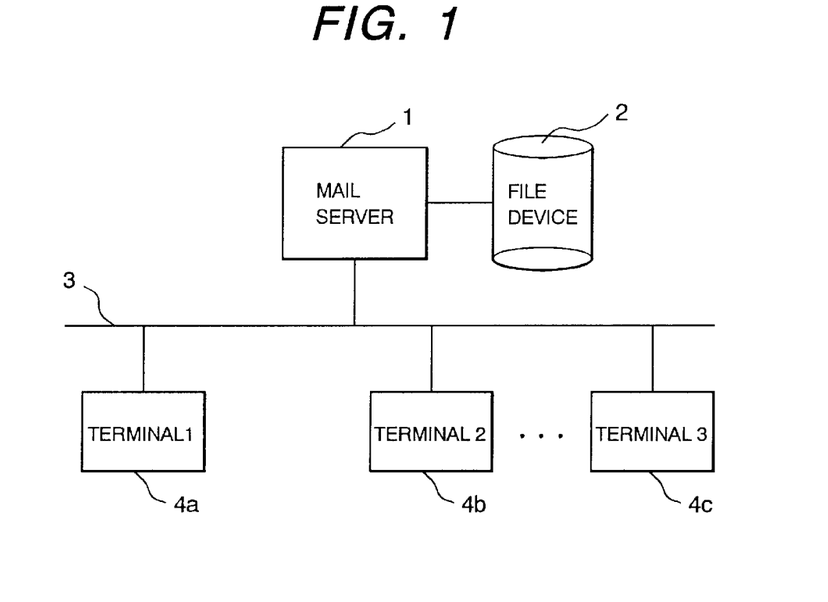
FIG. 1 is a block diagram showing a constitution example of the multimedia mail system of the present invention.

The embodiments of the present invention will be explained hereunder with reference to the accompanying drawings. FIG. 1 is a block diagram showing a configuration example of the system of the present invention which is necessary for operating a multimedia mail. The multimedia mail system is structured by connecting a plurality of terminal devices 4a, 4b, and 4c for generating and transmitting a message and receiving and regenerating a message and a mail server 1 including a file device 2 for storing mails with a network 3.

Figure 2:
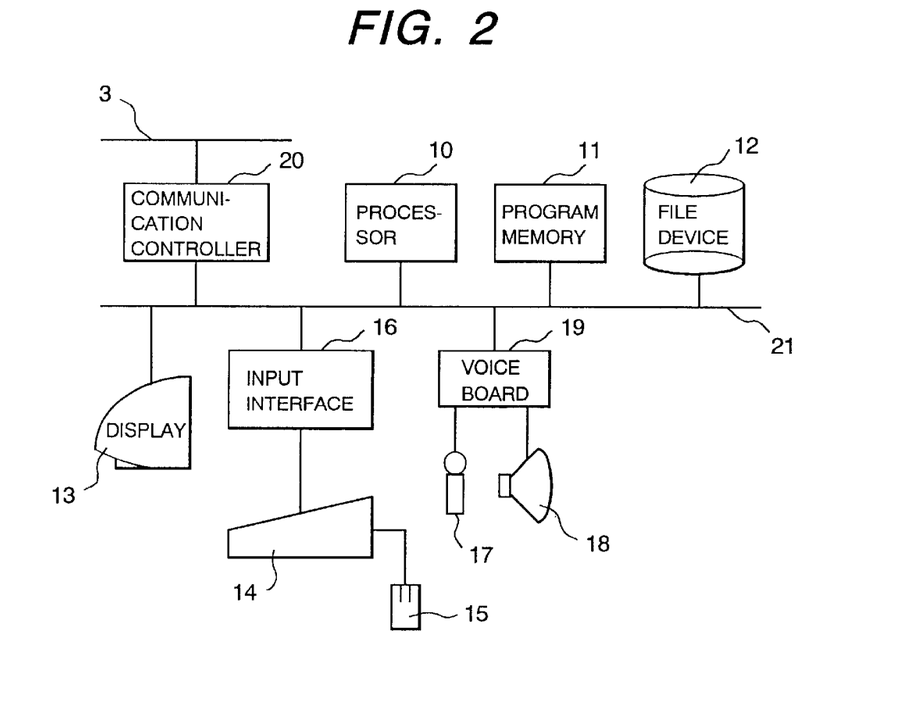
FIG. 2 is a block diagram showing terminals used in the multimedia mail system of the present invention.

FIG. 2 shows a block diagram of a terminal device. Each terminal device (4a, 4b, 4c) is structured so that a communication controller 20 for connecting to the network 3, a voice board 19 to which a voice input device 17 and a voice output device 18 are connected, a text information generator 14 and a drawing data generator 15 which are connected via an input interface 16, a display 13 for displaying text and drawing data, a file device 12 for storing a program, a memory 11 for reading a program when it is executed, and a processor 10 are connected with a bus 21. A message generation program and a message regeneration program are stored in the file device 12 and called by the program memory 11 as required.

Figure 3:
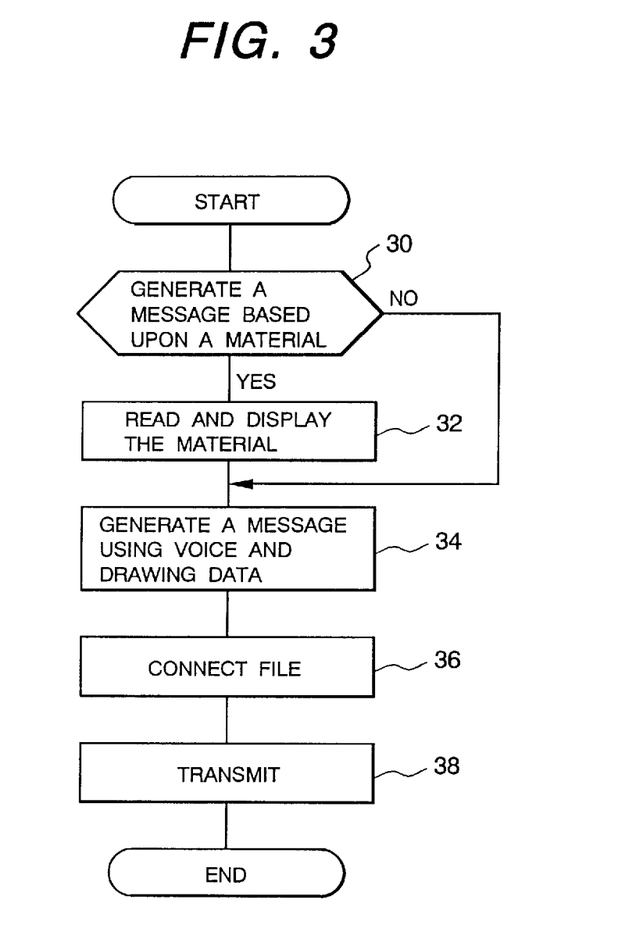
FIG. 3 is a flow chart showing the operation procedure of a message generation program.

FIG. 3 is a flow chart showing the procedure up to message transmission in the message generation program. The message generation program is started and it selects generation of a message using an existing material or generation of a message using no material (Step 30). When the program generates a message using an existing material, it reads the material as a background picture (Step 32). When the program generates a message by drawing data on a blank drawing area without using a material (Step 30), it does not read the background picture and generates a message using voice and drawing data (Step 34). When the message generation ends, the program connects the drawing information, voice information, and background information (Step 36) and designates the mail server as a destination terminal and transmits the message to it (Step 38). When the program connects each of the drawing voice and background information, it adds data with regard to the size of each to the top of the connection file.

Figure 4:
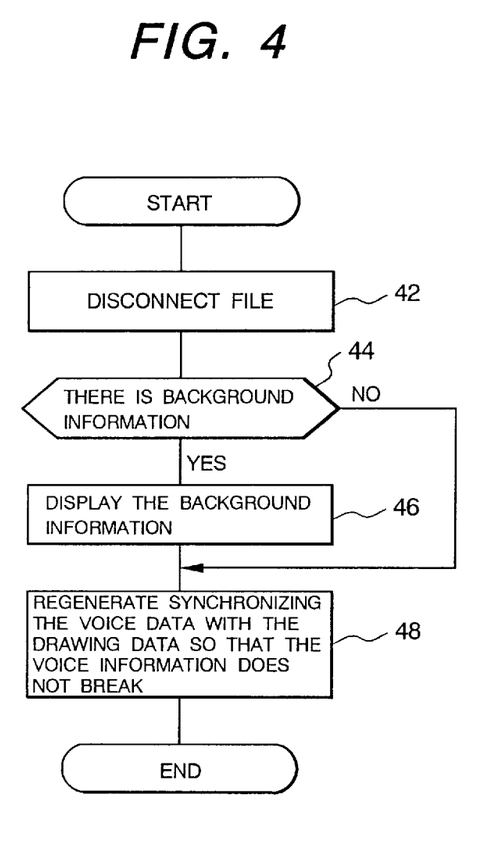
FIG. 4 is a flow chart showing the operation procedure of a message regeneration program.

FIG. 4 is a flow chart showing the operation procedure of the message regeneration program. The message regeneration program is started and it extracts drawing information, voice information, and background information from the received mail (Step 42). Next, the program decides whether there is background information or not at Step 44. When there is background information, the program displays the background information (Step 46) and regenerates the voice data and drawing data (Step 48). In this case, the voice data and the drawing data are synchronized with each other for regeneration so that there is no break in voice information.

Figure 5:
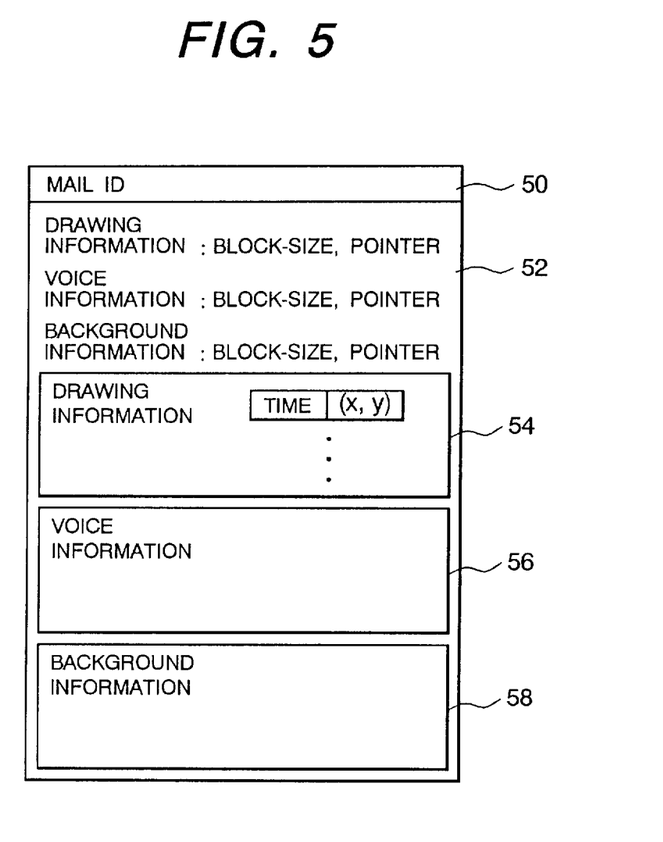
FIG. 5 is a drawing showing an example of the structure of information which is exchanged in the multimedia mail system of the present invention.

FIG. 5 is a drawing showing the structure of a message file which is transmitted or received in the multimedia mail system of the present invention. A mail ID 50 including destination information and address information of a transmission source is added to the top of the mail. Drawing information 54, voice information 56, and background information 58 are connected to the mail body and data with regard to the size of each type of this information is recorded at the top as information 52. When the system generates a message in a drawing area which is in a blank state without reading the background file, it handles the size of the background file as 0. The receiving terminal disconnects the connected data individually on the basis of the information 52 described at the top of the mail body.

As drawing information, the time required for drawing, X coordinate, and Y coordinate are recorded at every point. As time information, the elapsed time after start of generation of a message is recorded. Discrimination of a series of drawing data is made by inserting an identifier "start" or "end" when a series of drawing starts or ends.

Figure 6:
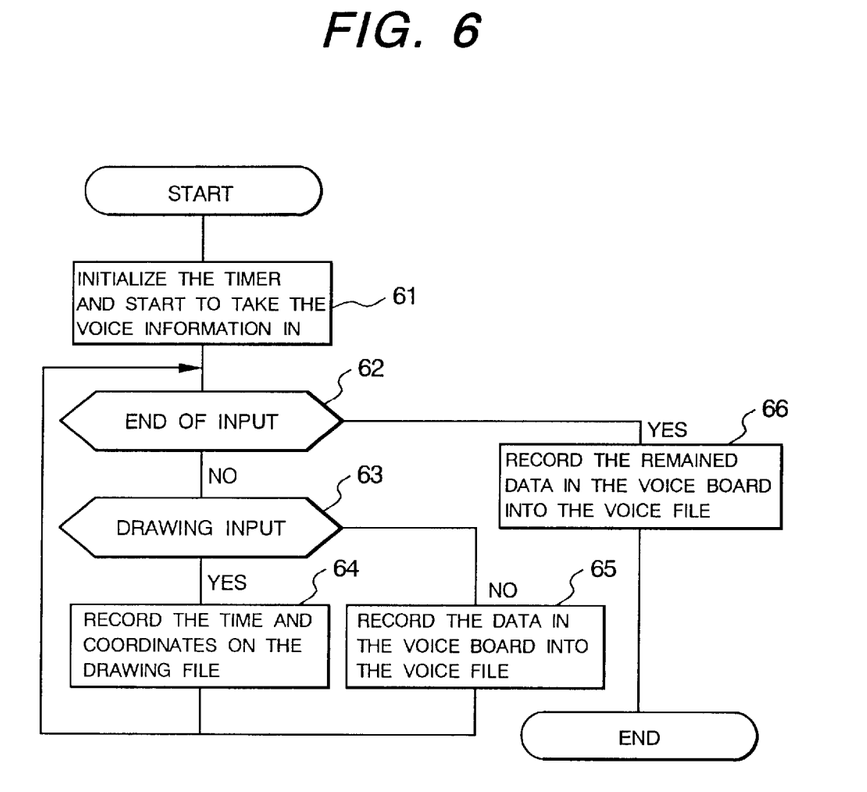
FIG. 6 is a flow chart showing an example of the message generation procedure.

FIG. 6 is a flow chart showing an example of the message generation procedure. When message generation is selected, the program initializes the timer and starts to take the voice information in the voice board (Step 61). Until message generation end is selected (Step 62), the time required for drawing and coordinates are recorded on the drawing data file at the point of time when the drawing of one point is executed (Step 63) and the compressed binary voice data stored in the voice board is stored into the voice data file in time intervals occurring in the drawing process (Step 63) (Step 65). By recording the voice data stored in the voice board in every interval of a drawing event like this, voice data can be recorded without missing any by correctly recording the drawing data occurrence time. When a message generation end is selected (Step 62), the remaining data in the voice board is recorded into the voice data file (Step 66).

Figure 7:
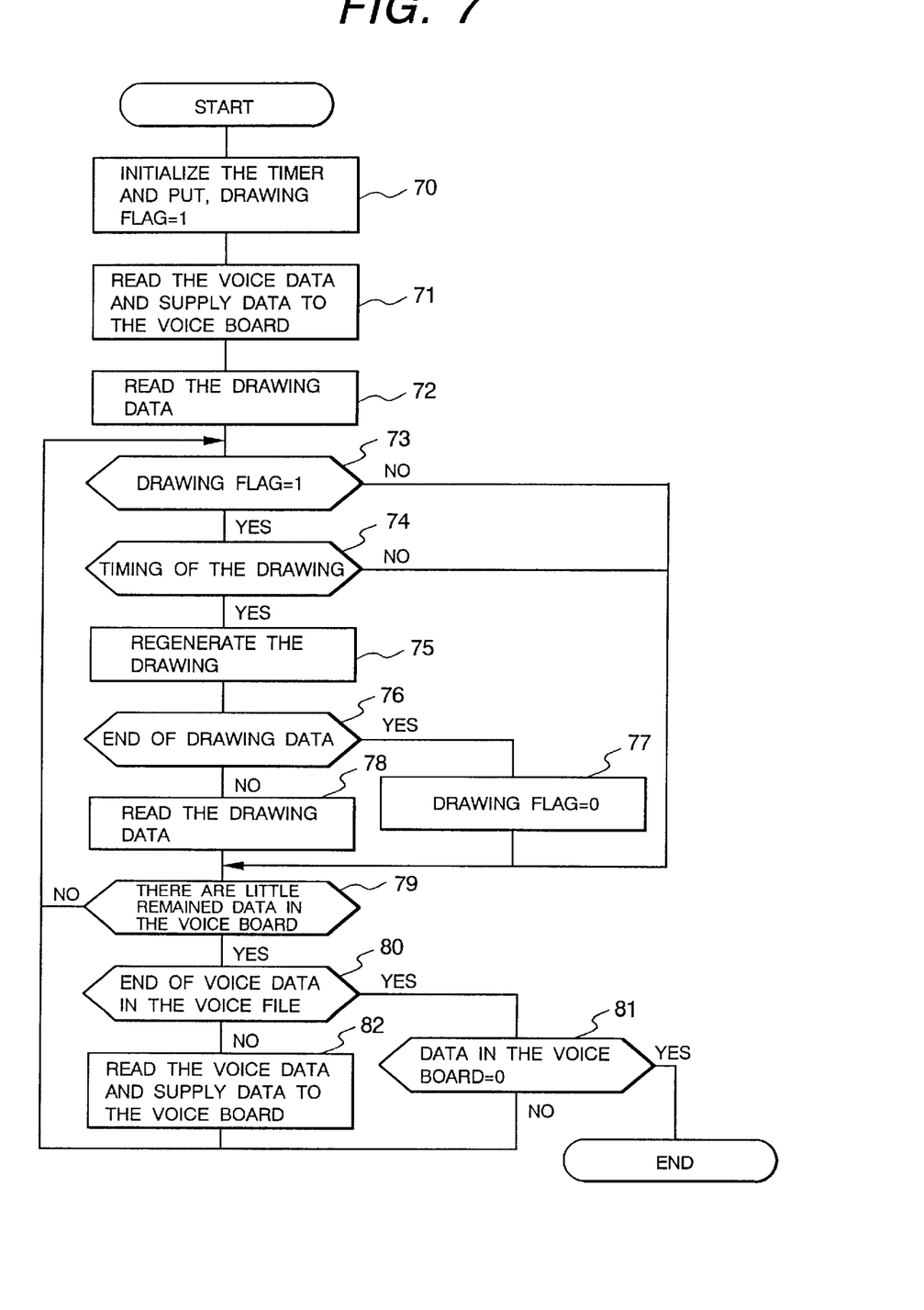
FIG. 7 is a flow chart showing an example of the message regeneration procedure.

FIG. 7 is a flow chart showing the message regeneration procedure used for a message generation procedure in which the time information and coordinates are recorded on the drawing data recording file whenever the aforementioned drawing event of one point occurs and the voice data is recorded into the voice data file in the intervals of a drawing event. When message regeneration is started, the program initializes the timer, sets the drawing flag (Step 70), supplies the voice data to the voice board, and starts to regenerate the voice information (Step 71). Next, the drawing data of one point is read (Step 72). When the drawing data flag is 1 (Step 73), the program checks whether the read drawing data reaches the time for regeneration (Step 74). When it reaches the time for regeneration, the drawing data is regenerated (Step 75). When some drawing data to be regenerated remains (Step 76), the next drawing data is read (Step 78). When the regeneration of all the drawing data ends (Step 76), the program changes the drawing flag to 0 (Step 77) so as to keep the processing away from the drawing data regeneration routine. The remaining data in the voice board is monitored (Step 79) when the regeneration of the drawing data of one point ends (Step 75) and the next drawing data is read (Step 78), or when the read drawing data does not reach the time for regeneration (Step 74), or when the regeneration of all the drawing data ends. When a little data remains in the voice board, the next voice data is read from the voice file and supplied to the voice board (Step 82). When the supply of all the voice data in the voice file to the voice board ends (Step 80) and the regeneration of all the voice data in the voice board ends (Step 81), the regeneration of the message ends.

Figure 9:
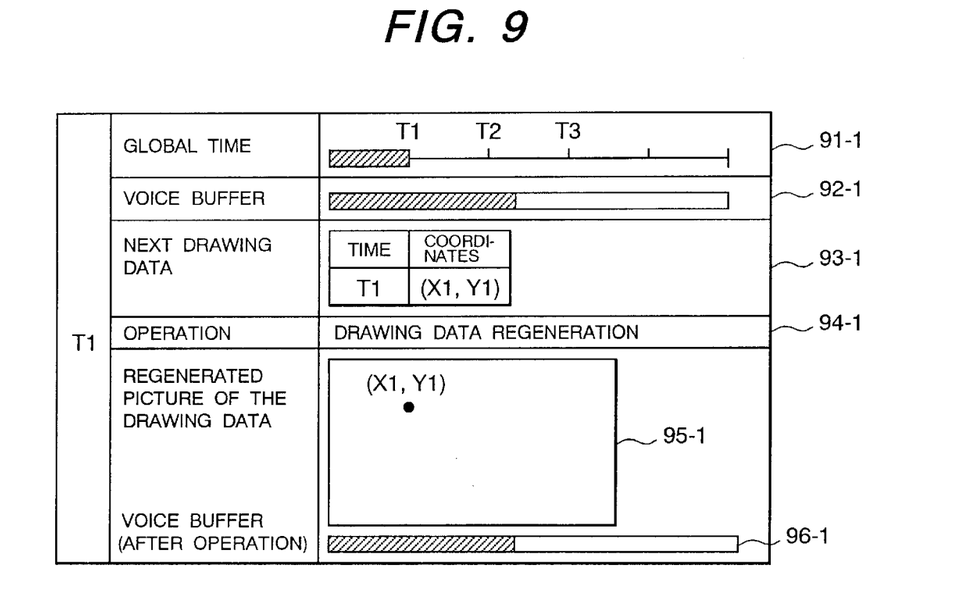
FIG. 9 is a drawing showing an example of an operation and an operation result in the time status T1 for message regeneration.

FIG. 9 is a drawing showing an example of an operation and an operation result at time T1. The time status at global time 91-1 indicates that the drawing data at the coordinates (X1, Y1) shown at 93-1 reaches the time T1 for regeneration. Since there is enough remaining data also in the voice buffer shown at 92-1, the operation here is a regeneration of the drawing data as shown at 94-1. The status of the regenerated picture of the drawing data after this operation is shown at 95-1 and displayed at the coordinates (X1, Y1) of the picture. The remaining data in the voice buffer immediately after this operation is as shown at 96-1 and is little different from that at 92-1.

Figure 10:
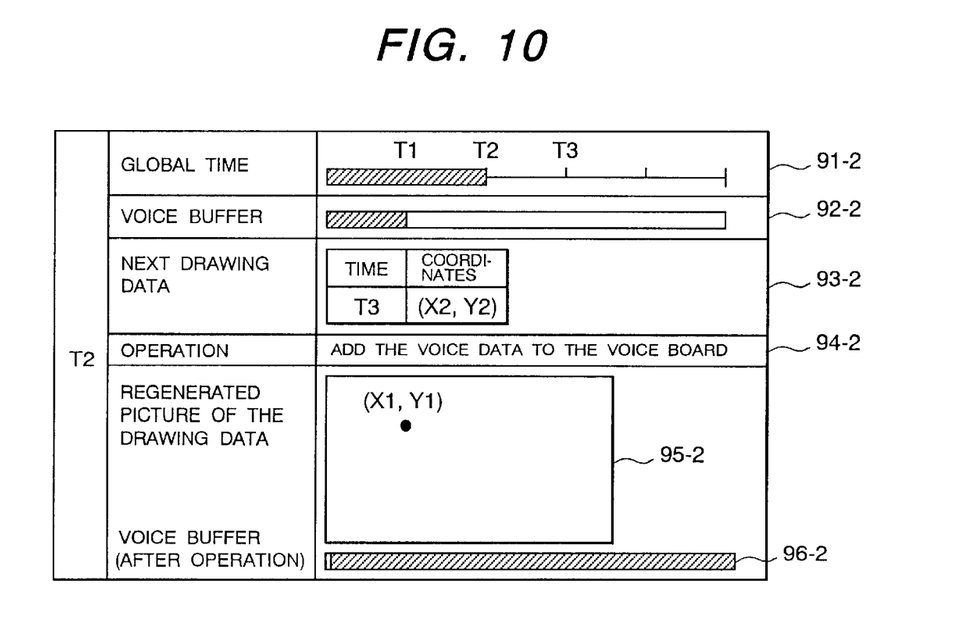
FIG. 10 is a drawing showing an example of an operation and an operation result in the time status T2 for message regeneration.

FIG. 10 is a drawing showing an example of an operation and an operation result at time T2. The time status at global time 91-2 indicates that the drawing data reaches the time T2 and the status at 92-2 indicates that there is little remaining data in the voice buffer. The drawing data to be regenerated next which is shown at 93-3 is the drawing data at the coordinates (X2, Y2) at time T3, and it shows that the drawing data does not reach the time for regeneration. Therefore, the operation at the time T2 shown at 94-2 is addition of voice data. The status of the regenerated picture of the drawing data after this operation is not different from the status shown in FIG. 9 as shown at 95-2. The status of the voice buffer after the operation is the status in which the voice data is added as shown at 96-2.

Figure 11:
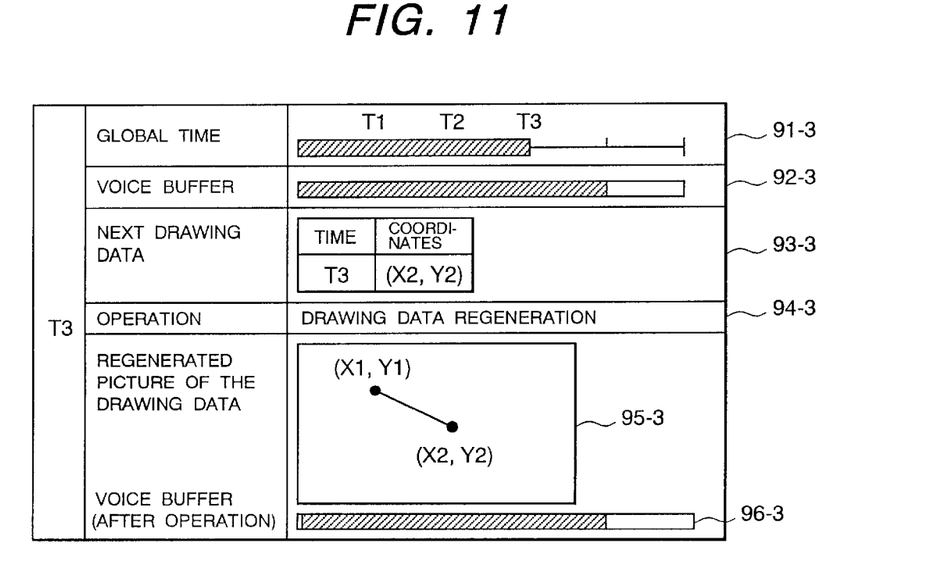
FIG. 11 is a drawing showing an example of an operation and an operation result in the time status T3 for message regeneration.

FIG. 11 is a drawing showing an example of an operation and an operation result at time T3. The time status at global time 91-3 indicates that the drawing data reaches the time T3 for regenerating the next drawing data. Since there is enough remaining data also in the voice buffer shown at 92-3, the operation here is regeneration of the drawing data. The status of the regenerated picture of the drawing data after the operation is the status in which the drawing by the data at the coordinates (X2, Y2) is completed as shown at 95-3 and the status of the voice buffer is as shown at 96-3.

Figure 12:
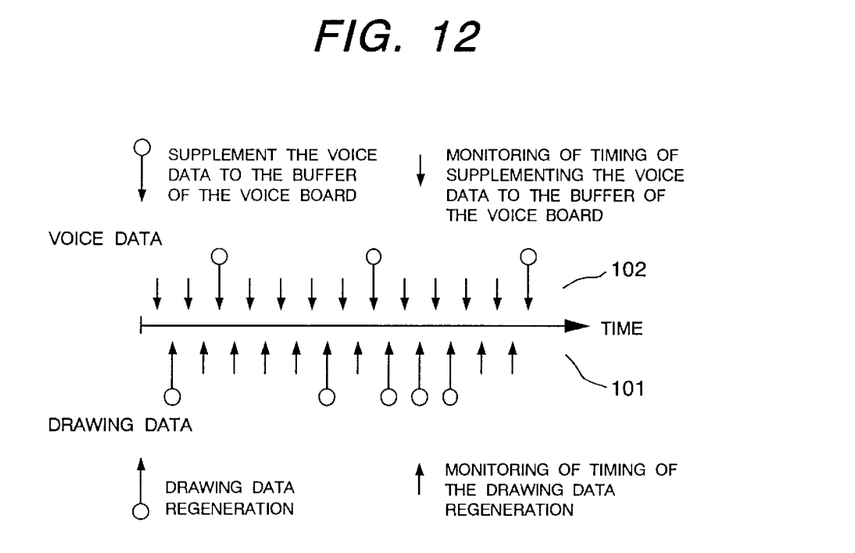
FIG. 12 is a drawing showing an example of monitoring of timing for message regeneration.

FIG. 12 shows a situation 101 of regeneration of drawing data and the monitoring of the regeneration timing and a situation 102 of supplementing the voice data to the buffer and monitoring of the timing thereof. Monitoring of the timing of the drawing data regeneration and monitoring of the voice buffer are executed alternately. The supplementing of the voice data to the buffer is executed at an almost fixed time interval.

As mentioned above, by regenerating the drawing data when the time elapsed from the regeneration start time reaches the time data which is recorded as drawing data and monitoring the remaining data in the voice board before regeneration of the drawing data of one point and in the standby state of the drawing data regeneration, the drawing data can be regenerated at the same timing as that for the message generation without any break in the voice.

Figure 13:
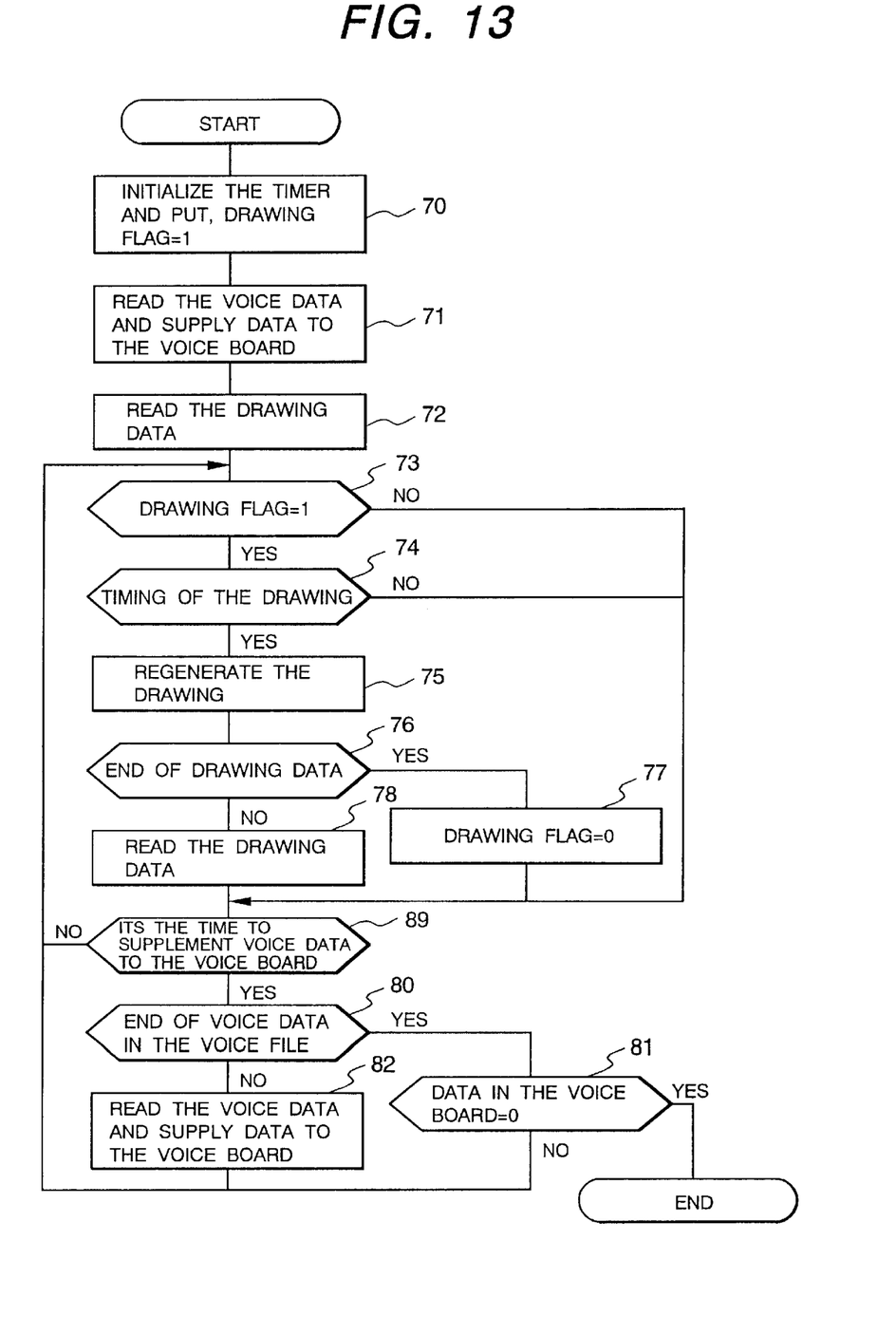
FIG. 13 is a flow chart showing another example of the message regeneration procedure.

FIG. 13 is a flow chart showing an example of another message regeneration procedure in place of the message regeneration procedure explained in FIG. 7 which is executed by monitoring the remaining voice data in the voice board. At Step 79 shown in FIG. 7, the remaining voice data in the voice board is monitored. In place of it at Step 89 shown in FIG. 13, it is monitored whether the time has arrived to supplement the voice data to the voice board which is calculated from the buffer capacity of the voice board and the time required for regenerating the voice data. The other steps are the same as those shown in FIG. 7.

Also by the message regeneration procedure shown in the flow chart in FIG. 13, the drawing data can be regenerated at the same timing as that for message regeneration without any break of the voice.

Figure 14:
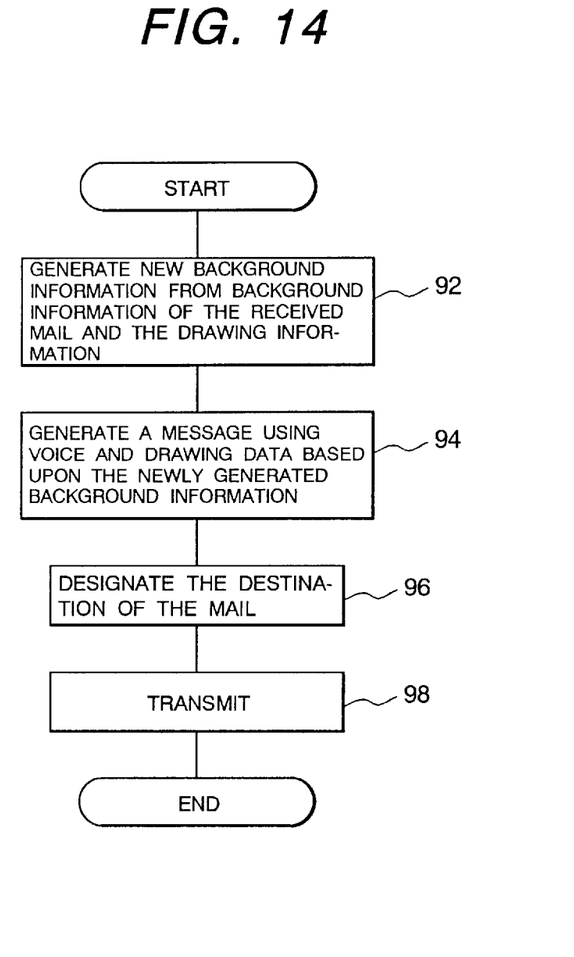
FIG. 14 is a flow chart showing the response generation procedure for a multimedia mail.

FIG. 14 is a flow chart showing the response generation procedure for multimedia mail. When multimedia mail is received that is generated by the voice and drawing data using a background picture which is the material, new background information in the state in which the drawing information is described in the background information is generated from the background information and drawing information of the received mail (Step 92). Next, a message using voice and drawing data is generated using the newly generated background information (Step 94). The message generation procedure at this step may be the same procedure as that shown in FIG. 6. When the generation of a message ends, the destination is designated (Step 96) and the message is transmitted (Step 98).

By using the aforementioned means, generation of a response using voice and drawing data or generation of a new message is made possible by quoting the received information.

The multimedia mail system of the present invention records the coordinates data as well as the time for drawing when recording drawing data, so that the drawing data can be regenerated in the case of regeneration at the same timing as that for message generation.

The multimedia mail system of the present invention records the drawing data for message generation whenever a drawing event of one point occurs and records the voice data stored in the voice board in every interval of a drawing event, so that the voice data can be recorded without any voice part missing by correctly recording the drawing data occurrence time.

The multimedia mail system of the present invention regenerates the drawing data for message generation when the time elapsed from the regeneration start time reaches the time which is recorded as the drawing data, checks the remaining voice data in the voice processing means before regeneration of the drawing data of one point and during the standby state of the drawing data regeneration time, and supplies voice data to the voice board when there is little remaining voice data in the voice board, so that the drawing data can be regenerated at the same timing as that for the message generation without any break in the voice information.

Also by a means for calculating the time for supplying voice data to the voice board from the buffer capacity of the voice board and the time required for regenerating voice data and supplying voice data to the voice board in the time interval for regenerating a mail, the drawing data is regenerated at the same timing as that for message generation without generation of any break in the voice information.

Furthermore, by generating new background information in the state in which drawing information is described in background information from the background information and drawing information included in a received mail, generating a message using voice and drawing data for this new background information, and transmitting it to a destination terminal which is designated for transmission, it is made possible to generate a response using voice and drawing data or generate a new message by quoting the received information.

The invention claimed is:

1. A multimedia mail system comprising:

a plurality of terminal devices;

a network for connecting said terminal devices to each other;

message generation means possessed by at least one first terminal device among said plurality of terminal devices for generating a message on the basis of a mutual relation between a time series of drawing data and a time series of voice data;

means for sending said generated message of the drawing data and the voice data to said network;

message receiving means possessed by at least one second terminal device among said plurality of terminal devices, for receiving and recording said generated message in a storage means; and regeneration means in said second terminal device for regenerating the drawing data and voice data included in said message for generation of said message on the basis of said mutual relation in the received message;

wherein said message generation means further comprises;

means for generating said drawing data point by point, and recording time information and coordinates information of each point into a drawing data recording file;

said regeneration means further comprises;

means for monitoring the remaining voice data in a voice recording means in said storage means, in the point by point intervals of said drawing data regeneration; and means for adding and recording voice data to be regenerated when said remaining data is too small for regenerating a next point of said drawing data.

2. A multimedia mail system comprising:

a plurality of terminal devices;

a network for connecting said terminal devices to each other;

message generation means possessed by at least one first terminal device among said plurality of terminal devices for generating a message on the basis of a mutual relation between a time series of drawing data and a time series of voice data;

means for sending said generated message of the drawing data and the voice data to said network;

message receiving means possessed by at least one second terminal device among said plurality of terminal devices, for receiving and recording said generated message in a storage means; and regeneration means in said second terminal device for regenerating the drawing data and voice data included in said message for generation of said message on the basis of said mutual relation in the received message;

said message generation means further comprising:

means for generating said drawing data point by point, and recording time information and coordinates information of each point into a drawing data recording file;

means for adding and recording voice data to be regenerated when said remaining data is too small for regenerating a next point of said drawing data; and means for calculating a time interval for supplying voice data to said voice recording means from the capacity of said voice recording means and the time required for regenerating said voice data in place of said means for monitoring the remaining voice data; and means for supplying voice data to said voice recording means in said time intervals.

* * * * *